US006288680B1

(12) United States Patent
Tsuru et al.

(10) Patent No.: US 6,288,680 B1
(45) Date of Patent: *Sep. 11, 2001

(54) ANTENNA APPARATUS AND MOBILE COMMUNICATION APPARATUS USING THE SAME

(75) Inventors: Teruhisa Tsuru, Kameoka; Seiji Kanba, Otsu; Toshifumi Oida, Omihachiman; Harufumi Mandai, Takatsuki, all of (JP)

(73) Assignee: Murata Manufacturing Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/040,686

(22) Filed: Mar. 18, 1998

(51) Int. Cl.[7] .......... H04B 1/38

(52) U.S. Cl. .......... 343/702; 455/575; 455/90; 343/752; 343/700 MS

(58) Field of Search .......... 343/752, 702, 343/700 MS; 455/575, 562, 90, 128, 129, 269

(56) References Cited

U.S. PATENT DOCUMENTS 5,696,517 * 12/1997 Kawahata et al. .......... 343/700 MS
5,760,746 * 6/1998 Kawahata .......... 343/702
5,973,651 * 10/1999 Suesada et al. .......... 343/752

FOREIGN PATENT DOCUMENTS 0621653 4/1994 (EP) .
0743699 11/1996 (EP) .
0749214 12/1996 (EP) .
0831546 3/1998 (EP) .

* cited by examiner

*Primary Examiner*—Lee Nguyen
*Assistant Examiner*—Simm Arguyen
(74) *Attorney, Agent, or Firm*—Ostrolenk, Faber, Gerb & Soffen, LLP

(57) ABSTRACT

An antenna apparatus 10 includes a chip antenna 14 provided with a conductor 11, a power-supply electrode 12 to which one end of the conductor 11 is connected, and a terminal electrode 13 to which the other end of the conductor is connected; and a mounting substrate 18 provided with a line-shaped radiative conductor 15 formed by printing an electrically conductive material on a surface, a line-shaped conductive pattern 16, and a substantially rectangular ground electrode 17. The chip antenna 14 is mounted on the mounting substrate 18. The power-supply electrode 12 of the chip antenna 14 is connected through the conductive pattern 16 on the mounting substrate 18 to a power-supply source V. The terminal electrode 13 of the chip antenna 14 is connected to one end of the radiative conductor 15 on the mounting substrate 18.

13 Claims, 6 Drawing Sheets

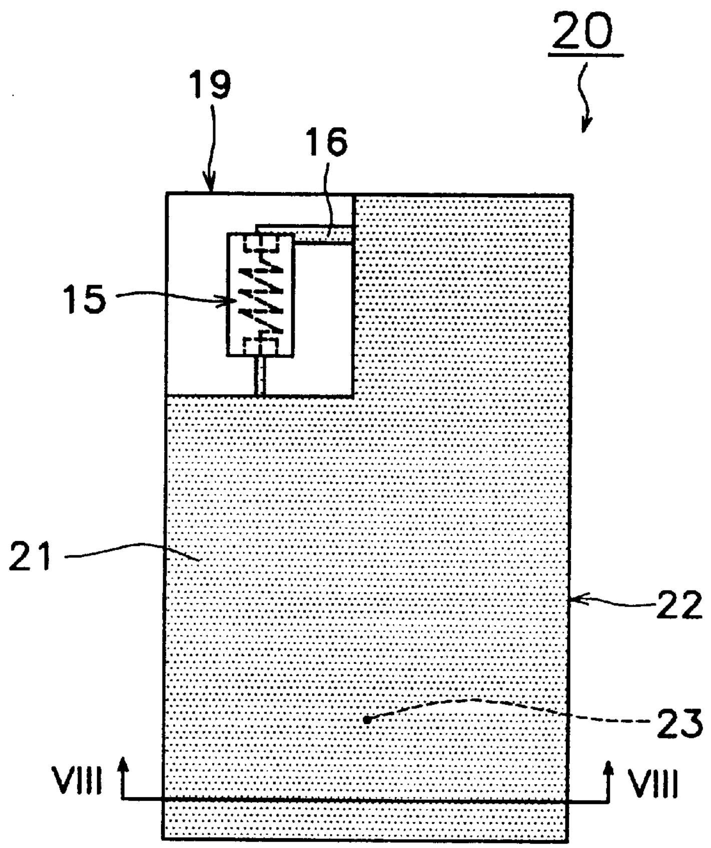
FIG. 7
FIG. 8
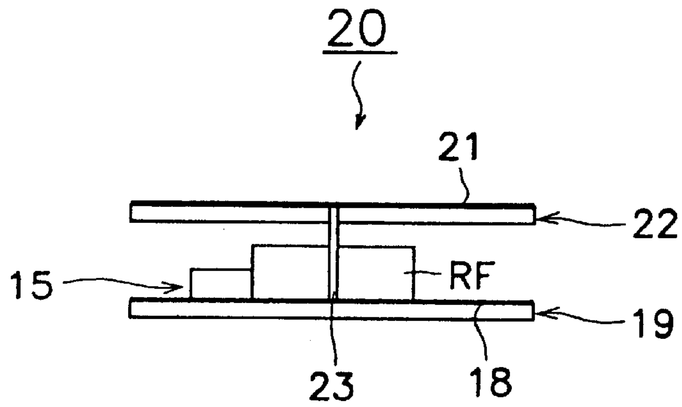

ANTENNA APPARATUS AND MOBILE COMMUNICATION APPARATUS USING THE SAME

BACKGROUND OF THE INVENTION

1. Field of the Invention

The present invention relates to an antenna apparatus and a portable radio gear using the same, and more particularly, to an antenna apparatus provided with a radiative conductor and a portable radio gear using the same.

2. Description of the Related Art

Monopole antennas and loop antennas have been conventionally used for portable radio gears such as a portable telephone and a pager. As a portable radio gear has been made compact, an antenna is required to be made compact. Since a monopole antenna and a loop antenna need to have a radiative conductor with a length of one-fourth the wavelength of the used signal, however, the antennas become large and a demand for compact antennas cannot be satisfied.

To solve this drawback, the applicant has proposed a chip antenna, such as that shown in FIG. 12, in the Japanese Unexamined Patent Publication No. 8-316725. A chip antenna 50 is provided with a rectangular-parallelepiped base member 51 having a mounting surface 511 and made from dielectric ceramic including barium oxide, aluminum oxide, and silica as its main components. Inside the base member 51, a spirally wound conductor 52 is formed. A power-supply electrode 53 for applying a voltage to the conductor 52 is formed on surfaces of the base member 51. One end of the conductor 52 is drawn to a surface of the base member 51 and connected to the power-supply electrode 53. The other end of the conductor 52 forms a free end 54 inside the base member 51.

When a compact chip antenna having a low resonant frequency is produced with the use of the above conventional chip antenna, however, since a conductor for transmitting and receiving a radio wave is short, the gain and bandwidth are reduced.

SUMMARY OF THE INVENTION

The present invention has been made to solve the above drawback. Accordingly, it is an object of the present invention to provide an antenna apparatus having a high gain and a wide bandwidth at a low resonant frequency and a portable radio gear using it.

To solve the foregoing drawback, the present invention provides an antenna apparatus including a chip antenna and a mounting substrate on which the chip antenna is mounted, the chip antenna including a base member made from ceramic, a conductor formed on the base member, and a power-supply electrode to which one end of the conductor is connected and a terminal electrode to which the other end of the conductor is connected, both formed on a surface of the base member, and the mounting substrate including a radiative conductor and a ground electrode, wherein the terminal electrode of the chip antenna is connected to one end of the radiative conductor of the mounting substrate.

According to the above antenna apparatus, since the mounting substrate is provided with the radiative conductor to be connected to the conductor of the chip antenna, the effective length of the conductor of the antenna apparatus becomes long. Therefore, since the current distribution of the conductor in the antenna apparatus becomes large and the radiative electric field of the antenna apparatus becomes strong, a high gain and a wide bandwidth are obtained in a low resonant frequency.

The above antenna apparatus may be configured such that a circuit board on which a ground electrode is formed at the side corresponding to that of the mounting substrate at which the chip antenna is mounted is disposed such that the mounting substrate is substantially parallel to the circuit board, and the ground electrode of the mounting substrate is connected to the ground electrode of the circuit board.

With this structure, the current flowing through the antenna apparatus flows into the ground electrode of the circuit board. Therefore, the characteristics of the antenna apparatus are unlikely to be subject to an effect of a ground disposed at the side of the mounting substrate where the chip antenna is not mounted.

The above antenna apparatus may be configured such that the base member is formed of a laminated member including a plurality of layers; each of the layers has a main surface; the base member has a lamination direction substantially perpendicular to the main surface; and the conductor is formed in a spiral shape and has a spiral axis substantially perpendicular to the lamination direction of the base member.

In the above antenna apparatus, the conductor may have a meander shape.

The present invention also provides a portable radio gear including the above antenna apparatus, a transmitting circuit connected to the antenna apparatus, a receiving circuit connected to the antenna apparatus, and a casing for covering the antenna apparatus, the transmitting circuit, and the receiving circuit.

Since the above portable radio gear has an antenna apparatus which can have a high gain and a wide bandwidth in a low resonant frequency, it can be used for transmission and receiving in a low frequency region. In addition, since it has an antenna apparatus which is unlikely to be subject to an effect of the ground, deterioration caused by the ground, in transmission and receiving of the portable radio gear is prevented.

BRIEF DESCRIPTION OF THE DRAWINGS

FIG. 7 is a top view of an antenna apparatus according to a second embodiment of the present invention.

FIG. 8 is a cross section taken on line VIII—VIII of the antenna apparatus shown in FIG. 7.

DESCRIPTION OF THE PREFERRED EMBODIMENTS

Figure 1:
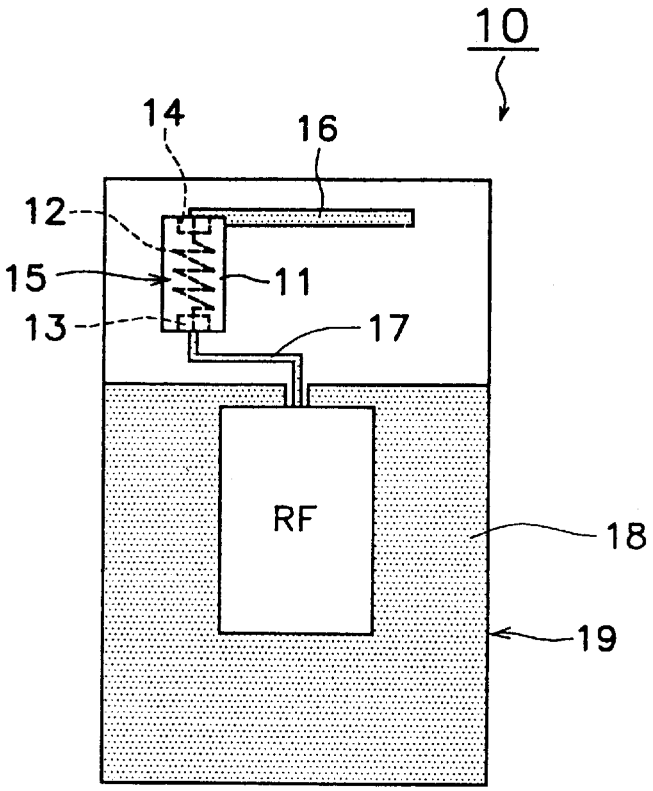
FIG. 1 is a top view of an antenna apparatus according to a first embodiment of the present invention.

The other features and advantages of the present invention will be made clearer by the following descriptions noted by referring to the drawings.

FIG. 1 is a top view of an antenna apparatus according to a first embodiment of the present invention. An antenna apparatus 10 includes a chip antenna 15 provided with a base member 11, a conductor 12 formed in the base member 11, a power-supply electrode 13 to which one end of the conductor 12 is connected, and a terminal electrode 14 to which the other end of the conductor is connected; and a mounting substrate 19 provided with a line-shaped radiative conductor 16 formed by printing an electrically conductive material on a surface, a line-shaped conductive pattern 17, and a substantially rectangular ground electrode 18.

The chip antenna 15 is mounted on the mounting substrate 19. The power-supply electrode 13 of the chip antenna 15 is connected through the conductive pattern 17 on the mounting substrate 19 to a high-frequency circuit RF of a portable radio gear on which the antenna apparatus 10 is mounted. The terminal electrode 14 of the chip antenna 15 is connected to one end of the radiative conductor 16 on the mounting substrate 19.

In the antenna apparatus 10 configured as described above, since the conductor 12 of the chip antenna 15 is directly connected to the radiative conductor 16 on the mounting substrate 19, the effective length of the conductor of the antenna apparatus 10 becomes long.

Figure 2:
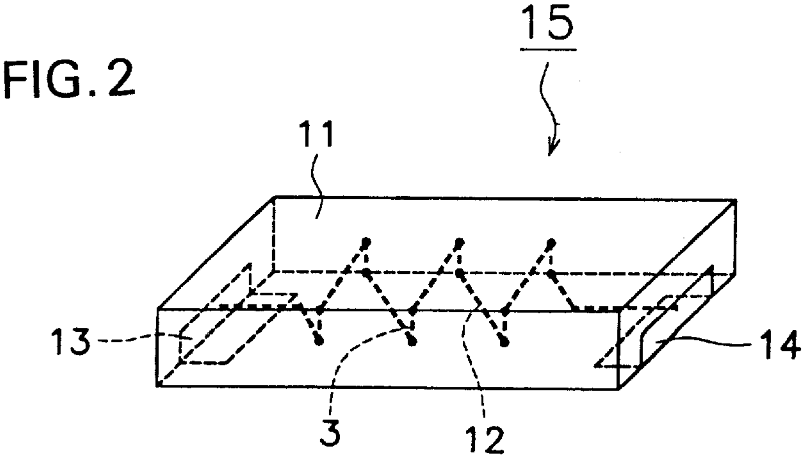
FIG. 2 is a transparent perspective view of a chip antenna constituting the antenna apparatus.

As shown in FIG. 2, the chip antenna 14 is provided with the rectangular-parallelepiped base member 1; the conductor 11 spirally wound in the longitudinal direction of the base member 1 inside the base member 1; the power-supply electrode 12 for applying a voltage to the base member 1, which is formed on a surface of the base member 1 and to which one end of the conductor 1 is connected; and the terminal electrode 13 formed on a surface of the base member 1 and to which the other end of the base member 1 is connected.

Figure 3:
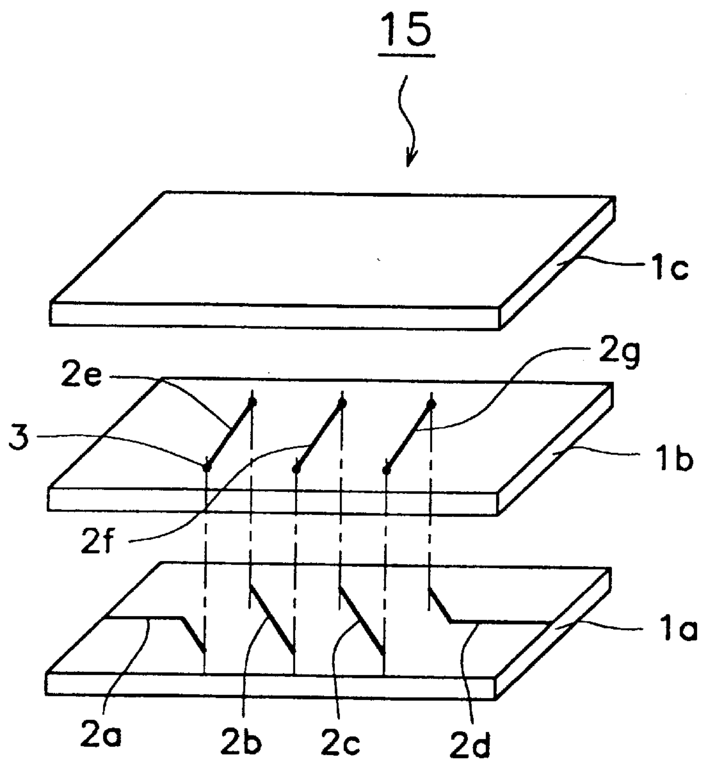
FIG. 3 is an exploded perspective view of the chip antenna shown in FIG. 2.

FIG. 3 is an exploded perspective view of the chip antenna 14 shown in FIG. 2. The base member 1 is formed by laminating rectangular sheet layers 2_a_ to 2_c_ made from dielectric ceramic including barium oxide, aluminum oxide, and silica as its main components. On surfaces of the sheet layers 2_a_ and 2_b_ among the layers, substantially L-shaped or substantially line-shaped electrically conductive patterns 3_a_ to 3_g_ are provided by the use of copper or a copper alloy by screen printing, deposition, or plating. Via holes 4 are formed in the thickness direction at specified positions (both ends of the electrically conductive patterns 3_e_ to 3_g_) on the sheet layer 3_b_.

The sheet layers 3_a_ to 3_c_ are laminated, the electrically conductive patterns 4_a_ to 4_g_ are connected with the via holes 4, and the base member is baked to form the conductor 12, which is spirally wound in the longitudinal direction of the base member 1 inside the base member 1.

One end of the conductor 12 (one end of the electrically conductive pattern 3_a_) is drawn to one end face having a short edge of the base member 1 and connected to the power-supply electrode 12, provided for a surface of the base member 1. The other end of the conductor 1 (one end of the electrically conductive pattern 3_d_) is drawn to the other end face having a short edge of the base member 1 and connected to the terminal electrode 13, provided for a surface of the base member 1.

Figure 4:
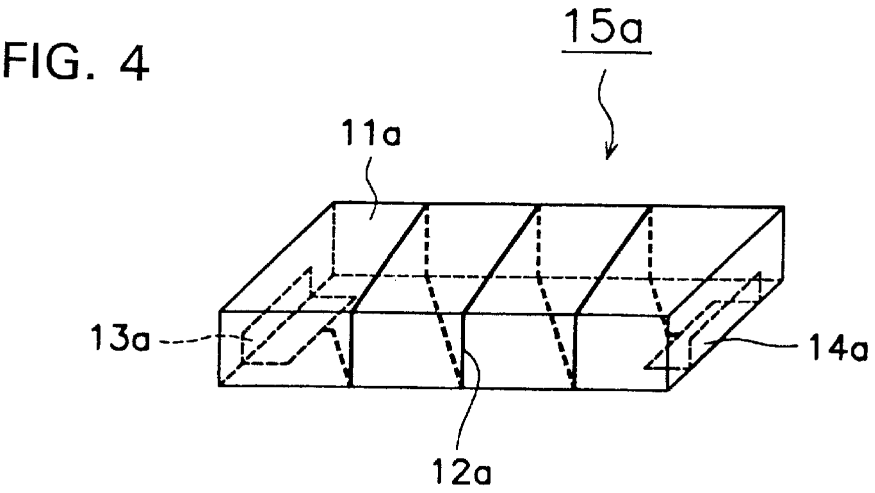
FIG. 4 is a transparent perspective view of a modification of the chip antenna shown in FIG. 2.
Figure 5:
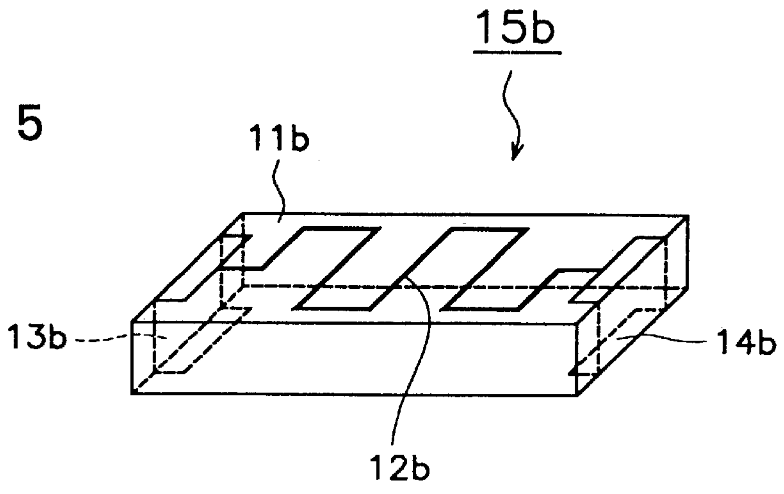
FIG. 5 is a transparent perspective view of another modification of the chip antenna shown in FIG. 2.

FIGS. 4 and 5 are transparent perspective views of modifications of the chip antenna 14, shown in FIG. 2. A chip antenna 14_a_ shown in FIG. 4 is provided with a rectangular-parallelepiped base member 1_a_; a conductor 11_a_ spirally wound in the longitudinal direction of the base member 1_a_ along surfaces of the base member 1_a_; and a power-supply electrode 12_a_ and a terminal electrode 13_a_ formed on surfaces of the base member 1_a_. One end of the conductor 11_a_ is connected to the power-supply electrode 12_a_ for applying a voltage to the conductor 11_a_ on one main surface of the base member 1_a_, and the other end of the conductor 11_a_ is connected to the terminal electrode 13_a_ on the main surface of the base member 1_a_. According to the chip antenna 14_a_ configured as described above, since the conductor 11_a_ can be easily formed spirally on surfaces of the base member 1_a_ by screen printing or other methods, the manufacturing process of the chip antenna 14_a_ can be simplified.

A chip antenna 14_b_ shown in FIG. 5 is provided with a rectangular-parallelepiped base member 1_b_; a conductor 11b formed on a surface of the base member 1_b_ in a meander shape; and a power-supply electrode 12_b_ and a terminal electrode 13_b_ formed on surfaces of the base member 1_b_. One end of the conductor 11_b_ is connected to the power-supply electrode 12_b_ for applying a voltage to the conductor 1_b_ on one main surface of the base member 1_b_, and the other end of the conductor 11_b_ is connected to the terminal electrode 13_b_ on the main surface of the base member 1_b_. According to the chip antenna 14_b_ configured as described above, since the meander-shaped conductor 11_b_ is formed only on the main surface of the base member 1_b_, the base member 1_b_ can be made to have a low profile. Accordingly, the chip antenna 14_b_ can be made to have a low profile. When the meandershaped conductor 11_b_ is formed inside the base member 1_b_, the same advantages are obtained.

Figure 6:
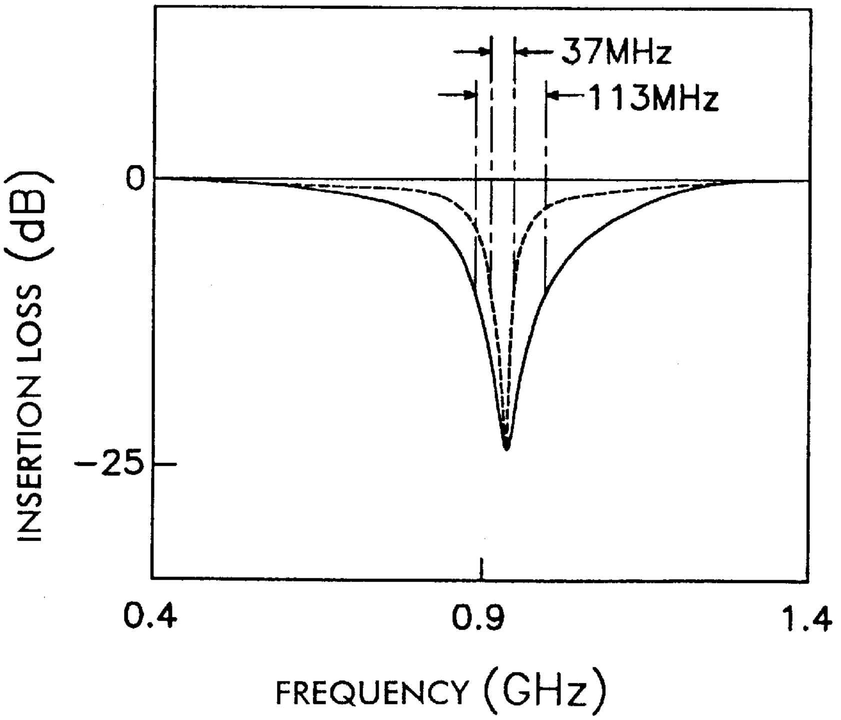
FIG. 6 is a view showing a pass characteristic of the antenna apparatus shown in FIG. 1.

FIG. 6 shows a pass characteristic (dBd) of the antenna apparatus 10 (FIG. 1). The chip antenna 14 measures 5 mm (width) by 8 mm (depth) by 2.5 mm (height), and the radiative conductor 15 measures 20 mm (width) by 1 mm (depth). The mounting substrate 18, on which the chip antenna 14 is mounted and the radiative conductor 15 is printed at a surface, measures 30 mm (width) by 60 mm (depth).

In FIG. 6, a solid line corresponds to the antenna apparatus 10 according to the first embodiment, which has the radiative conductor 15, and a dotted line corresponds to the conventional chip antenna 50 (FIG. 10), for comparison.

It is understood from FIG. 6 that, in a resonant frequency ranging from 930 MHz to 940 MHz, whereas the conventional chip antenna 50 has a bandwidth of 37 MHz and a gain of −4.0 dBd, the antenna apparatus 10 according to the first embodiment has a bandwidth of 113 MHz, which is wider by 76 MHz, and a gain of −3.0 dBd, which is larger by 1.0 dBd.

As for the size of a general monopole antenna, whereas a monopole antenna having a resonant frequency of 930 MHz to 940 MHz is about 80 mm long, the antenna apparatus 10 according to the first embodiment has a length of 22 to 23 mm in the width direction and the length is about one-fourth that of the conventional monopole antenna.

According to the antenna apparatus of the above first embodiment, since the mounting substrate is provided with the radiative conductor to be connected to the conductor of the chip antenna, the effective length of the conductor of the antenna apparatus becomes long. Therefore, since the current distribution of the conductor in the antenna apparatus becomes large and the radiative electric field of the antenna apparatus becomes strong, a high gain and a wide bandwidth are obtained in a low resonant frequency. As a result, a portable radio gear on which this antenna apparatus is mounted can be used for transmission and receiving in a low frequency region.

FIGS. 7 and 8 are a top view and a cross section of an antenna apparatus according to a second embodiment of the present invention. An antenna apparatus 20 differs from the antenna apparatus 10 (FIG. 1) according to the first embodiment in that a ground electrode 21 is formed on a surface at the side corresponding to that of a mounting substrate at which a chip antenna 15 is mounted, a circuit board 22 on which a circuit section (not shown) other than a high-frequency circuit of a portable radio gear on which the antenna apparatus 20 is mounted is disposed is positioned such that the mounting substrate 19 is parallel to the circuit board 22, and a ground electrode 18 on the mounting substrate 19 is connected to the ground electrode 21 on the circuit board 22 with a short-circuit pin 23.

Figure 9:
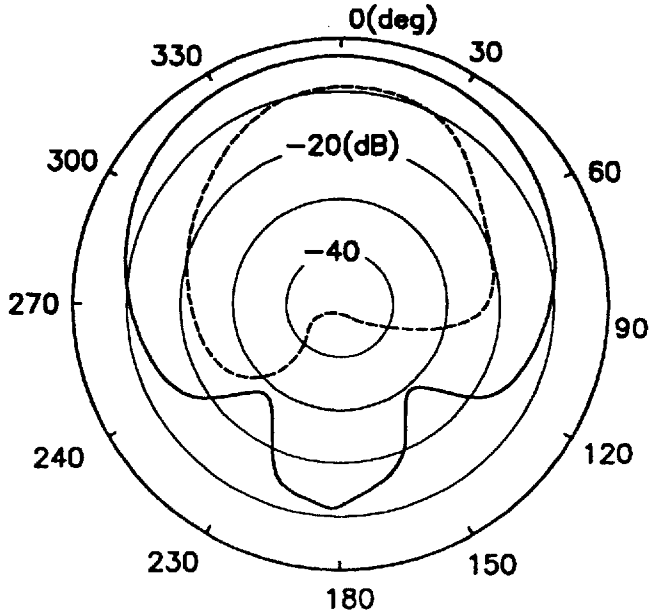
FIG. 9 is a view showing the directivity of the antenna apparatus shown in FIG. 1 and the directivity of the antenna apparatus shown in FIG. 7.

FIG. 9 shows the directivity of the antenna apparatus 20 (FIG. 7), which is provided with the circuit board 22, and that of the antenna apparatus 10 (FIG. 1), which is not provided with the circuit board 22, for comparison.

To check the effect of a ground, a ground plate is disposed in the 180-degree direction (the rear side of the sheets on which FIG. 1 and FIG. 7 are drawn). In FIG. 9, a solid line corresponds to the antenna apparatus 20 and a dotted line corresponds to the antenna apparatus 10.

It is understood from FIG. 9 that, when the ground plate is disposed close, whereas the antenna apparatus 10 (dotted line) has a gain of about −7.5 dB in the 0-degree direction, the antenna apparatus 20 (solid line) has a gain of about −4 dB in the 0-degree direction, and the antenna apparatus 20 provided with the circuit board 22 is more unlikely to be subject to an effect of the ground disposed in the 180-degree direction.

This is because, in the antenna apparatus 20 according to the second embodiment, since a current flowing through the antenna apparatus mainly flows into the ground electrode 21 of the circuit board 22 through the short-circuit pin 23, which is away from the ground plate disposed in the 180-degree direction, the current flowing through the antenna apparatus is unlikely to be canceled by a current flowing through the ground plate in the opposite direction.

According to the antenna apparatus of the above second embodiment, since the circuit board on which the ground electrode is formed at the side corresponding to that of the mounting substrate at which the chip antenna is mounted is disposed such that the mounting substrate is parallel to the circuit board, and the ground electrode on the mounting substrate is connected to the ground electrode on the circuit board by the short-circuit pin, the current flowing through the antenna apparatus mainly flows into the ground electrode of the circuit board through the short-circuit pin. Therefore, the characteristics of the antenna apparatus are unlikely to be subject to an effect of the ground disposed at the side of the mounting substrate where the chip antenna is not mounted. As a result, deterioration caused by the ground, in transmission and receiving of the portable radio gear on which this antenna apparatus is mounted is prevented.

Figure 10:
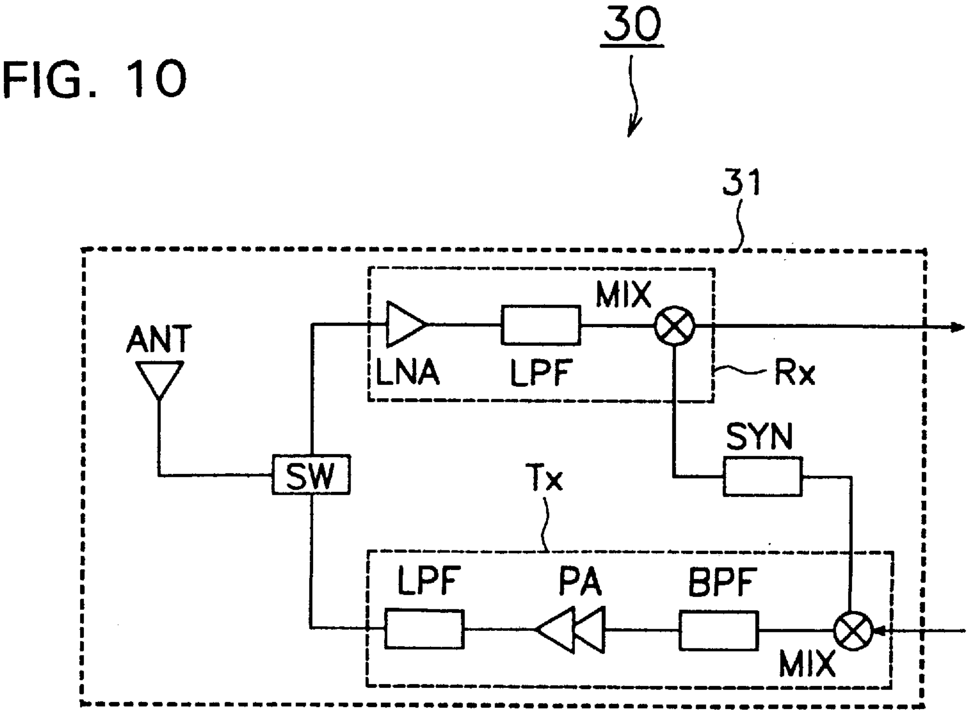
FIG. 10 is an RF block diagram of a portable radio gear using an antenna apparatus according to the present invention.

FIG. 10 is an RF block diagram of a portable telephone, which is a general portable radio gear. A portable telephone 30 includes an antenna ANT, a receiving circuit Rx and a transmitting circuit Tx both connected to the antenna ANT through a switch SW, the antenna ANT, the switch SW, and a casing 31 which covers the receiving circuit Rx and the transmitting circuit Tx.

The receiving circuit Rx is formed of a low-noise amplifier LNA, a low-pass filter LPF, and a mixer MIX. The transmitting circuit Tx is formed of a low-pass filter LPF, a bandpass filter BPF, a high-output amplifier PA, and a mixer MIX. A synthesizer SYN for generating a local signal is connected to one input of the mixer MIX in the receiving circuit Rx and one input of the mixer MIX in the transmitting circuit Tx.

The antenna apparatuses 10 and 20, shown in FIGS. 1 and 7, are used for the antenna ANT of the portable telephone 30, shown in FIG. 10. The switch SW, the receiving circuit Rx, and the transmitting circuit Tx of the portable telephone 30 are disposed inside the high-frequency circuit RF on the mounting substrate.

Figure 11:
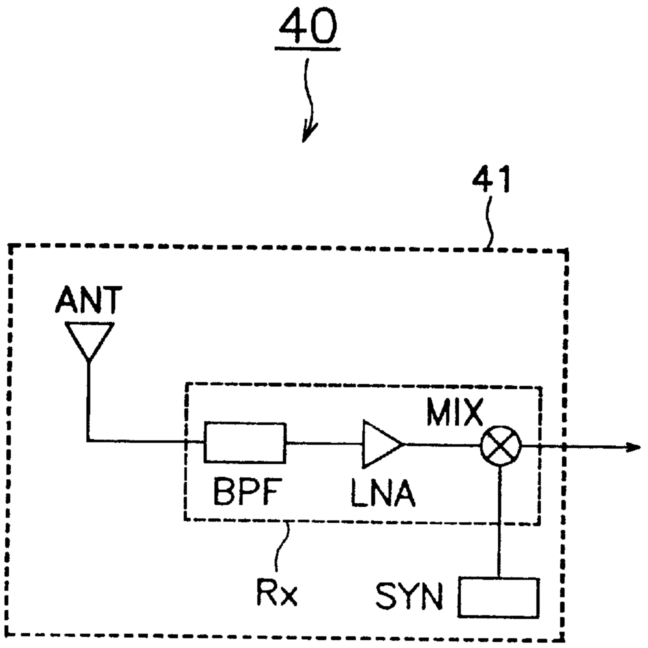
FIG. 11 is an RF block diagram of another portable radio gear using an antenna apparatus according to the present invention.
Figure 12:
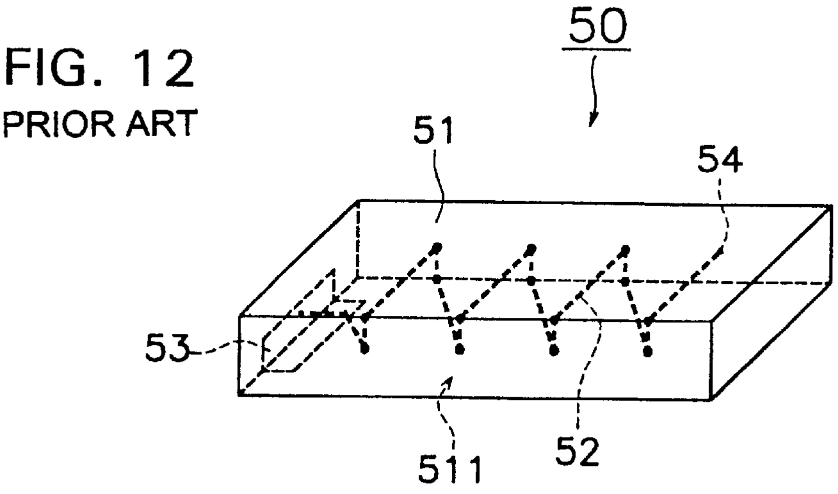
FIG. 12 PRIOR ART
FIG. 12 is a transparent perspective view of a conventional chip antenna.

FIG. 11 is an RF block diagram of a pager, which is a general portable radio gear. A pager 40 includes an antenna ANT, a receiving circuit Rx connected to the antenna ANT, and a casing 41 which covers the receiving circuit Rx. The receiving circuit Rx is formed of a bandpass filter BPF, a low-noise amplifier LNA, and a mixer MIX. A synthesizer SYN for generating a local signal is connected to one input of the mixer MIX of the receiving circuit Rx.

The antenna apparatuses 10 and 20, shown in FIGS. 1 and 7, are used for the antenna of the pager 40, shown in FIG. 11. The receiving circuit Rx of the pager 40 is disposed inside the high-frequency circuit RF on the mounting substrate 19.

According to the portable radio gears of the above embodiments, since an antenna apparatus which can have a high gain and a wide bandwidth in a low resonant frequency is used for the antennas of the portable radio gears, the portable radio gears on which the antenna apparatus is mounted can be used for transmission and receiving in a low frequency region.

An antenna apparatus which is unlikely to be subject to an effect of the ground disposed at the side of the mounting substrate at which the chip antenna is not mounted is used for the antenna of the portable radio gear, deterioration caused by the ground, in transmission and receiving of the portable radio gear on which this antenna apparatus is mounted is prevented.

In the antenna apparatuses according to the first and second embodiments, the radiative electrode is formed on a surface of the mounting substrate. When it is formed inside the mounting substrate, the same advantages are obtained.

In the above embodiments, the radiative electrode on the mounting substrate has a substantially rectangular shape. If it may have any shape, the same advantage is obtained when it is connected to the terminal electrode of the chip antenna.

The ground electrodes are formed on surfaces of the mounting substrate and the circuit board in the above embodiments. When they are formed inside the mounting substrate and the circuit board, the same advantages are obtained.

The base member of the chip antenna is made from a dielectric material having barium oxide, aluminum oxide, and silica as its main components in the above embodiments. The base member is not limited to this dielectric material. When it is made from a dielectric material having titanium oxide and neodymium oxide as its main components, a magnetic material having nickel, cobalt, and iron as its main components, or a combination of a dielectric material and a magnetic material, the same advantages are obtained.

The present invention has been disclosed and described in relation to its preferred embodiments. Those skilled in the art understand that the above and other modifications may be performed within the scope of the present invention.

What is claimed is:

1. An antenna apparatus comprising a chip antenna and a mounting substrate on which said chip antenna is mounted, said chip antenna including a base member made from ceramic, a conductor formed on said base member, and a power-supply electrode to which one end of said conductor is connected and a terminal electrode to which the other end of said conductor is connected, both formed on a surface of said base member, and said mounting substrate including a radiative conductor and a ground electrode, wherein the terminal electrode of said chip antenna is connected to one end of the radiative conductor of said mounting substrate, said radiative conductor being disposed so as to be asymmetrically connected with respect to the conductor of the chip antenna near one end of the radiative conductor to the conductor of the chip antenna as viewed in a direction perpendicular to a plane in which the mounting substrate is disposed.

2. An antenna apparatus according to claim 1, wherein a circuit board on which a ground electrode is formed at the side corresponding to that of said mounting substrate at which said chip antenna is mounted is disposed such that said mounting substrate is substantially parallel to said circuit board, and the ground electrode of said mounting substrate is connected to the ground electrode of said circuit board.

3. An antenna apparatus according to claim 2, wherein said base member is formed of a laminated member including a plurality of layers;

each of said layers has a main surface;

said base member has a lamination direction substantially perpendicular to said main surface; and said conductor is formed in a spiral shape and has a spiral axis substantially perpendicular to the lamination direction of said base member.

4. A portable radio gear comprising: an antenna apparatus according to claim 3; a transmitting circuit connected to said antenna apparatus; a receiving circuit connected to said antenna apparatus; and a casing for covering said antenna apparatus, said transmitting circuit, and said receiving circuit.

5. An antenna apparatus according to claim 2, wherein said conductor has a meander shape.

6. A portable radio gear comprising: an antenna apparatus according to claim 5; a transmitting circuit connected to said antenna apparatus; a receiving circuit connected to said antenna apparatus; and a casing for covering said antenna apparatus, said transmitting circuit, and said receiving circuit.

7. A portable radio gear comprising: an antenna apparatus according to claim 2; a transmitting circuit connected to said antenna apparatus; a receiving circuit connected to said antenna apparatus; and a casing for covering said antenna apparatus, said transmitting circuit, and said receiving circuit.

8. An antenna apparatus according to claim 1, wherein said base member is formed of a laminated member including a plurality of layers;

each of said layers has a main surface;

said base member has a lamination direction substantially perpendicular to said main surface; and said conductor is formed in a spiral shape and has a spiral axis substantially perpendicular to the lamination direction of said base member.

9. A portable radio gear comprising: an antenna apparatus according to claim 8; a transmitting circuit connected to said antenna apparatus; a receiving circuit connected to said antenna apparatus; and a casing for covering said antenna apparatus, said transmitting circuit, and said receiving circuit.

10. An antenna apparatus according to claim 1, wherein said conductor has a meander shape.

11. A portable radio gear comprising: an antenna apparatus according to claim 6; a transmitting circuit connected to said antenna apparatus; a receiving circuit connected to said antenna apparatus; and a casing for covering said antenna apparatus, said transmitting circuit, and said receiving circuit.

12. A portable radio gear comprising: an antenna apparatus according to claim 1; a transmitting circuit connected to said antenna apparatus; a receiving circuit connected to said antenna apparatus; and a casing for covering said antenna apparatus, said transmitting circuit, and said receiving circuit.

13. The antenna apparatus according to claim 1 wherein the radiative conductor has a first length and the conductor of the chip antenna has a second length and wherein an effective length of the antenna apparatus is a total of the first length and the second length.

* * * * *